United States Patent

Toni

[15] 3,635,398
[45] Jan. 18, 1972

[54] ENGINE RATING PRESSURE RATION COMPUTER

[72] Inventor: Anselmo Toni, Wapping, Conn.
[73] Assignee: United Aircraft Corporation, East Hartford, Conn.
[22] Filed: Mar. 20, 1970
[21] Appl. No.: 21,555

[52] U.S. Cl. .................................235/88, 235/61 NV
[51] Int. Cl. ........................................................G06c 3/00
[58] Field of Search ..........................235/84, 88, 78, 61 NV

[56] References Cited

UNITED STATES PATENTS

| | | | |
|---|---|---|---|
| 2,528,518 | 11/1950 | Huber | 235/84 |
| 2,767,919 | 10/1956 | Huber | 235/84 |
| 3,084,858 | 4/1963 | Clapp | 235/84 |
| 3,023,954 | 3/1962 | Gurney et al. | 235/84 |
| 3,220,644 | 11/1965 | Gaudio | 235/78 |
| 3,410,483 | 11/1968 | Hogan | 235/89 |
| 3,528,605 | 9/1970 | Ransone | 235/78 |

Primary Examiner—Richard B. Wilkinson
Assistant Examiner—Stanley A. Wal
Attorney—Jack N. McCarthy

[57] ABSTRACT

A computer for determining turbine engine pressure ratio limits during engine operation for several inflight ratings. The computer comprises a circular base with a circular overlay mounted thereon for relative movement. Indicia indicative of static air temperature (SAT), total air temperature (TAT) and altitude are placed at different radii in arcuate form on the circular base with arcuate windows being provided on the overlay to read said indicia to insure the overlay is positioned at a desired position with respect to the circular base. While the windows over the altitude indicia only have an arrowhead selector, the window for SAT and TAT has a scale representing Mach number. Also on the base are two sets, or families, of curves representing Mach numbers. Each set of these curves has been calculated to meet with a mating curve formed on one side of each of two other windows on the overlay which is marked in numbers representing engine pressure ratio.

While the circular base and circular overlay of this computer can be hand operated, it is to be understood that they can be turned by other means. An instrument wherein the circular base could be moved by total air temperature (TAT) and the circular overlay could be turned by the speed of an aircraft to read in Mach number is contemplated. A fixed hair line in front of the base and overlay is used to read off the indicated Mach number and the indicated total air temperature. When these are properly lined up on the hair line, the static air temperature (SAT) can be read directly therefrom.

10 Claims, 6 Drawing Figures

ENGINE RATING PRESSURE RATION COMPUTER

BACKGROUND OF THE INVENTION

This invention relates to a computer for indicating the desired engine pressure ratio for a specific inflight rating at a predetermined pressure and temperature. While hand-operated computers are not new, such as shown by U.S. Pat. No. 3,220,644, the structural arrangement and arrangement of data and its use is novel as does the combination of the SAT and TAT temperature makes with the Mach number scale.

SUMMARY OF THE INVENTION

A primary object of the present invention is to provide a hand-operated computer which can be used in the cockpit of an aircraft to determine the required engine pressure ratio (EPR). The hand-operated computer is an inexpensive computing means on which to compute the appropriate rating EPR. Further, the operation of this device is relatively simple and includes in the positioning of the numbers built-in factors which need not become a problem to the operator.

This computer aids in achieving long engine life in that the computer aids the pilot or flight engineer by decreasing his work load requirement in maintaining engine operation within inflight ratings as set by an aircraft engine manufacturer.

An object of this invention is to provide means for reading SAT by proper relative positioning of a TAT scale and Mach number scale. This can be continuously read by moving a TAT scale so that the actual TAT is kept aligned with a hair line while moving another Mach number scale so that the actual Mach number is kept aligned with the same hair line.

DESCRIPTION OF THE PREFERRED EMBODIMENT

Figure 1:
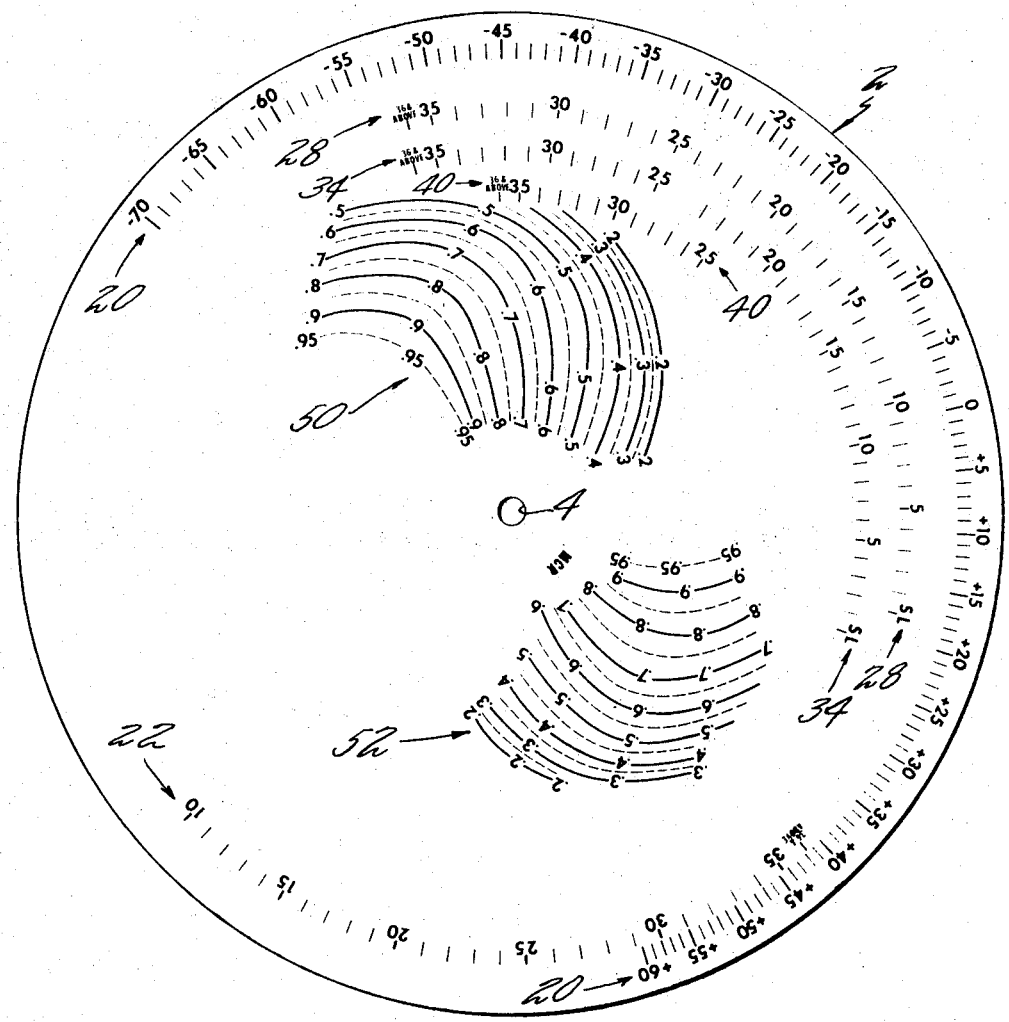
FIG. 1 is a view showing the circular base member of the computer.

The hand-operated computer set forth in the figures comprises two main parts, a circular base member 2 having a center opening 4 and a circular overlay member 3 having a center opening 5. When assembled, a nut and bolt arrangement 7 extends through the openings 4 and 5 to maintain the two members 2 and 3 on center and permit them relative movement about said center.

Figure 2:
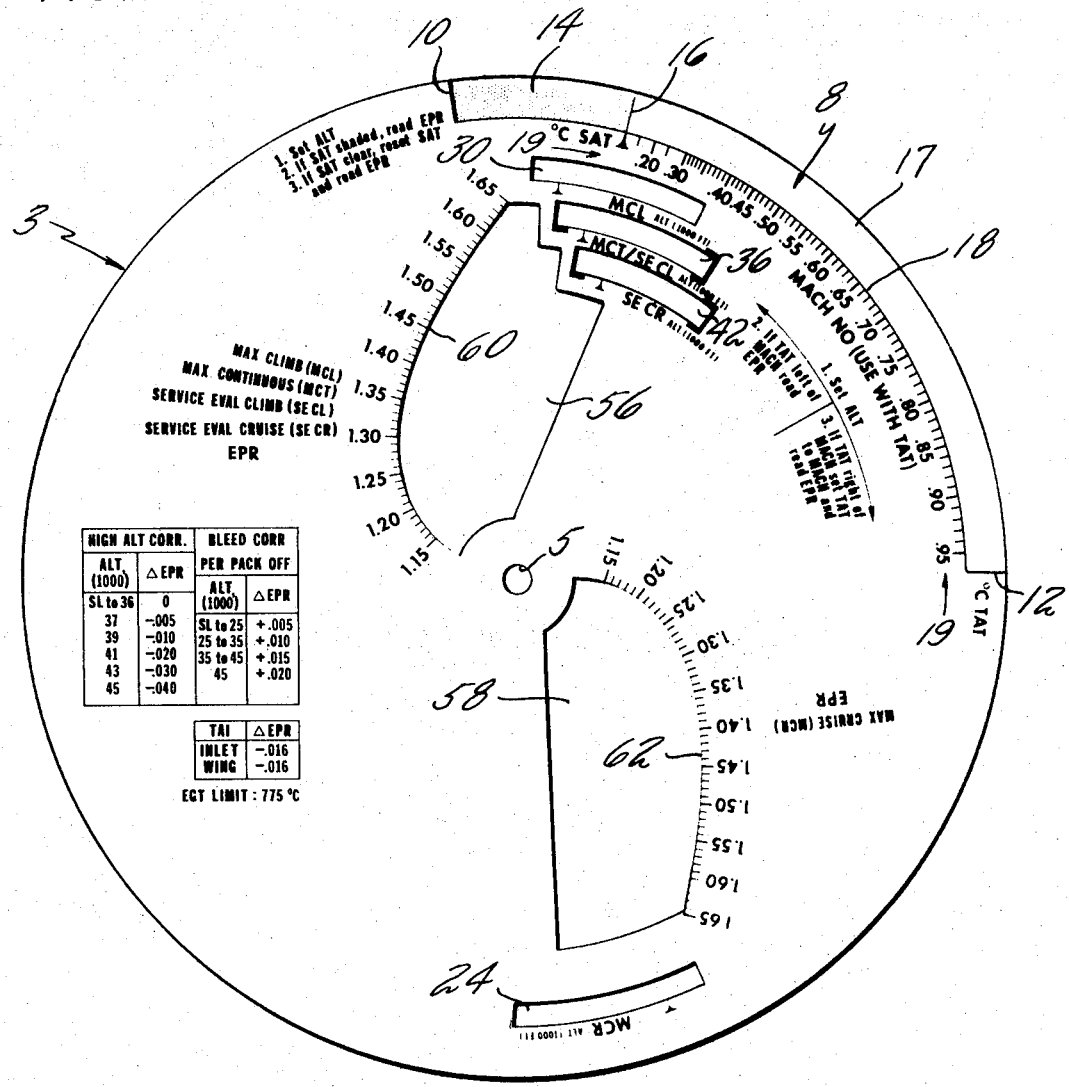
FIG. 2 is a view of the movable circular overlay member of the computer which is adapted to be mounted on said base member with the two members being movable relative to each other about their center.

As shown in FIG. 1, the circular base 2 has five sets of indicia arranged thereon in arcuate form at five different radii. Around the outer edge of the base member 2 at the largest radii, an arcuate scale 20 is set forth with numbers running from −70 to +60 and, as shown in FIG. 2, these numbers will be read through a window 8 which is located adjacent the outer edge of the overlay member 3 between lines 10 and 12. A portion of this window 8 is shaded or colored for viewing at 14 between lines 10 and 16 while the remainder 17 between the line 16 and line 12 is clear for viewing. Around the inner edge 18 of the window 8 an arrowhead appears pointing at the line 16 with the marking "°C. SAT" to the left thereof. Between the arrowhead and the end of the window 12 an arcuate scale 19 is set forth having numerals which indicate "-MACH NO." The heading "°C. TAT" appears to the right of the line 12.

The second arcuate scale on base member 2, which is located just radially inwardly from the outer scale 20 (FIG. 1), is scale 22. This scale has numbers indicating pressure altitudes in thousands running from 10 to 35 and has one noting of "36 and above." These numbers will be read through an arcuate window 24 on member 3 (FIG. 2). An arrowhead appears along the outer arc of the arcuate window 24 and is used to point at one of the numbers on scale 22 to determine the maximum cruise (MCR) rating for that altitude in a manner to be hereinafter described.

The third arcuate scale on base member 2, which is located just radially inwardly from the scale 22, is scale 28 (FIG. 1). This scale has indicia indicating pressure altitudes in thousands running from SL (sea level) to 35 and has one noting of "36 and above." These numbers will be read through an arcuate window 30 on member 3 (FIG. 2). An arrowhead appears along the inner arc of the arcuate window 30 and is used to point at one of the indicia on scale 28 to determine the maximum climb (MCL) rating for that altitude in a manner to be hereinafter described.

The fourth arcuate scale on base member 2, which is located just radially inwardly from the scale 28, is scale 34 (FIG. 1). This scale is similar to scale 28 in that it has indicia indicating pressure altitudes in thousands running from SL to 35 and has one noting of "36 and above." These indicia will be read through an arcuate window 36 on member 3 (FIG. 2). An arrowhead appears along the inner arc of the arcuate window and is used to point at one of the indicia on scale 34 to determine the maximum continuous (MCT) rating or service evaluation climb (SE CL) rating for that altitude in a manner to be hereinafter described.

The fifth arcuate scale on base member 2, which is located just radially inwardly from the scale 34, is scale 40 (FIG. 1). This scale has numbers indicating pressure altitudes in thousands running from 25 to 35 and has one noting of "36 and above." These numbers will be read through an arcuate window 42 on member 3 (FIG. 2). An arrowhead appears along the inner arc of the arcuate window 42 and is used to point at one of the numbers on scale 22 to determine the service evaluation cruise (SE CR) rating for that altitude in a manner to be hereinafter described.

The circular base 2 has two sets, or families, of curves 50 and 52 (FIG. 1) representing Mach numbers with the values running from 0.2 to 0.95. The family of curves 50 will be read through a window 56 in member 3 (FIG. 2) while the family of curves 52 will be read through window 58 therein. Each of the windows 56 and 58 are of generally irregular contour so that the necessary portion of the cooperating family of curves can be seen therethrough. One side of each window 56 and 58 is made a predetermined contour such as 60 and 62, respectively, with appropriate numerical markings thereon so that a specific number will appear where each Mach number line intersects. These numbers indicate a specific engine pressure ratio setting. The family of curves 50 are used when the Mach number is known and one is trying to find the engine pressure ratio (EPR) necessary for a maximum climb, maximum continuous, service evaluation climb, or service evaluation cruise conditions. The family of curves 52 are used when the Mach number is known and one is trying to find the engine pressure ratio (EPR) necessary for maximum cruise conditions.

Each family of curves are plotted from data on rating curves for particular engines or engine models being used. In the event an engine is being certified by the FAA, these rating curves would be available therefrom.

Charts are printed on the face of the overlay member 3 to make engine pressure ratio (EPR) corrections. The charts shown are for the JT9D–3 engine built by Pratt & Whitney Aircraft and used on the Boeing 747 aircraft. One chart provides EPR corrections for altitudes over 36,000 feet. A second chart makes EPR corrections related to the amount of air bled from the engine compressors for air conditioning. For example, in the Boeing 747, three packs, or air-conditioning units, are used and if one pack or unit were turned off at 25,000 feet this would permit an addition of 0.010 to the EPR reading, if two packs were turned off, it would permit an addition of 0.020 to the EPR reading. The third chart relates to thermal anti-icing (TAI). As with the air conditioning, on the Boeing 747 air can be bled to the engine inlets or to the wing to provide for protection against icing. If air is being bled to the inlet of the engines for this purpose, it is necessary that 0.016 be taken away from the value determined for the EPR setting. A like amount will be taken off if air is being bled to the wings for anti-icing.

For the specific engine model used, to arrive at the specific families of curves used in combination with the altitude settings, the inflight ratings were referenced to ICAO Standard Day as follows:

1. the Maximum Continuous (MCT) rating and Service Evaluation Climb (SE CL) ratings above 25,000 feet—Standard Day +5° C.,
2. Maximum Climb (MCL) rating, all altitudes: Maximum Continuous (MCT) rating below 25,000 feet—Standard Day +8° C.,
3. Service Evaluation Cruise (SE CR) rating, above 25,000 feet—Standard Day +9.6° C.,
4. Maximum Cruise (MCR) rating, all altitudes—Standard Day +8° C.

The inflight ratings of this engine referred to in the last paragraph are defined below:

MCT—maximum thrust that may be used continuously during an emergency situation at the discretion of the pilot. This rating is used to certificate an aircraft for an "engine-out" situation.

MCL—maximum thrust approved for normal climb.

MCR—maximum thrust approved for cruising.

SE CR and SE CL
ratings which are higher than the normal maximum climb (MCL) and maximum cruise (MCR) ratings but not greater than predetermined FAA rating.

An example will be set forth showing how this computer can be used to arrive at the proper EPR during maximum climb in accordance with the maximum climb (MCL) rating. In this example, the Mach number of the aircraft is 0.80 and it is at an altitude of 25,000 feet. The Standard Day temperature at 25,000 feet is −34.5° C. Since we are discussing the maximum climb rating, the Standard Day +8° C. would be −26.5° C. For the computer to determine the rating EPR either SAT or TAT can be used.

Figure 3:
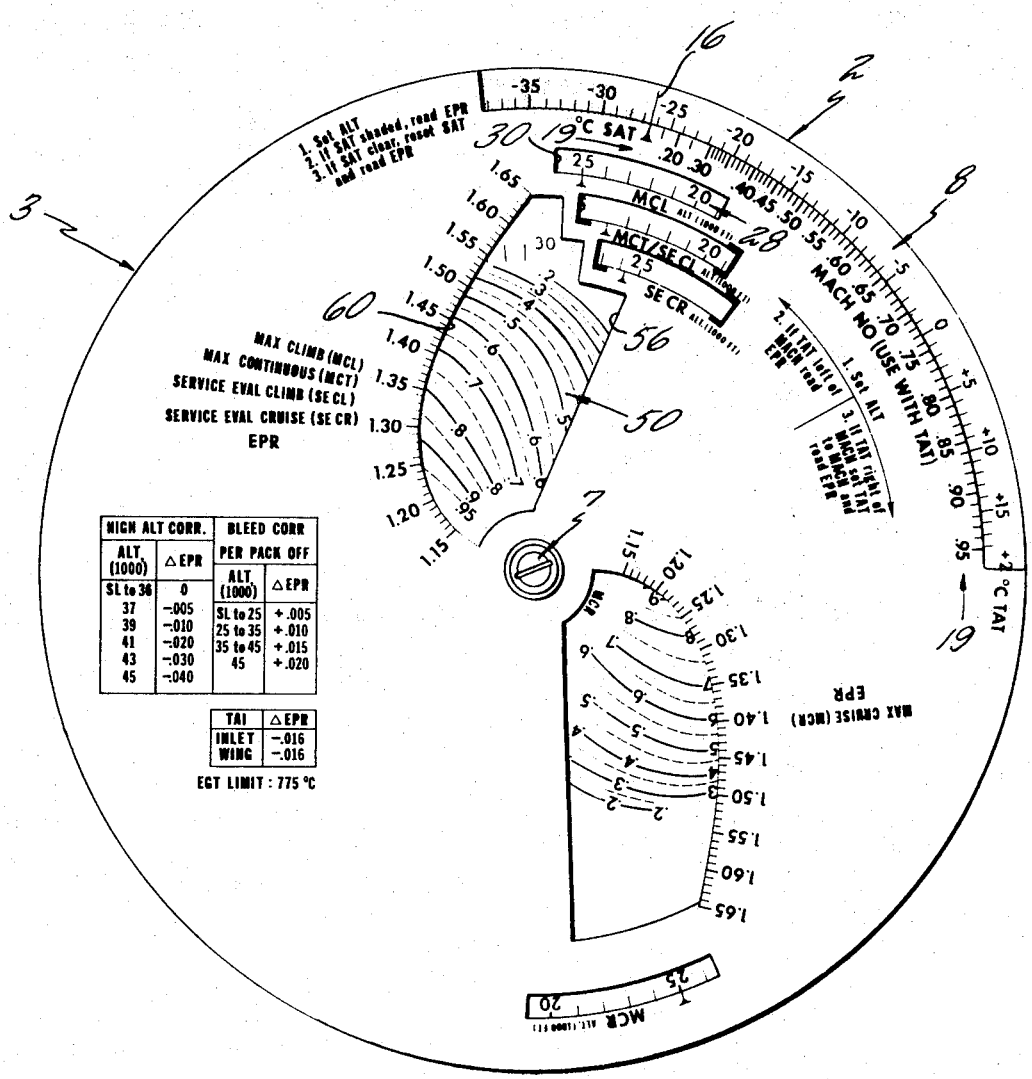
FIG. 3 is a view of the computer assembled with the maximum climb (MCL) altitude setting on 25.
Figure 4:
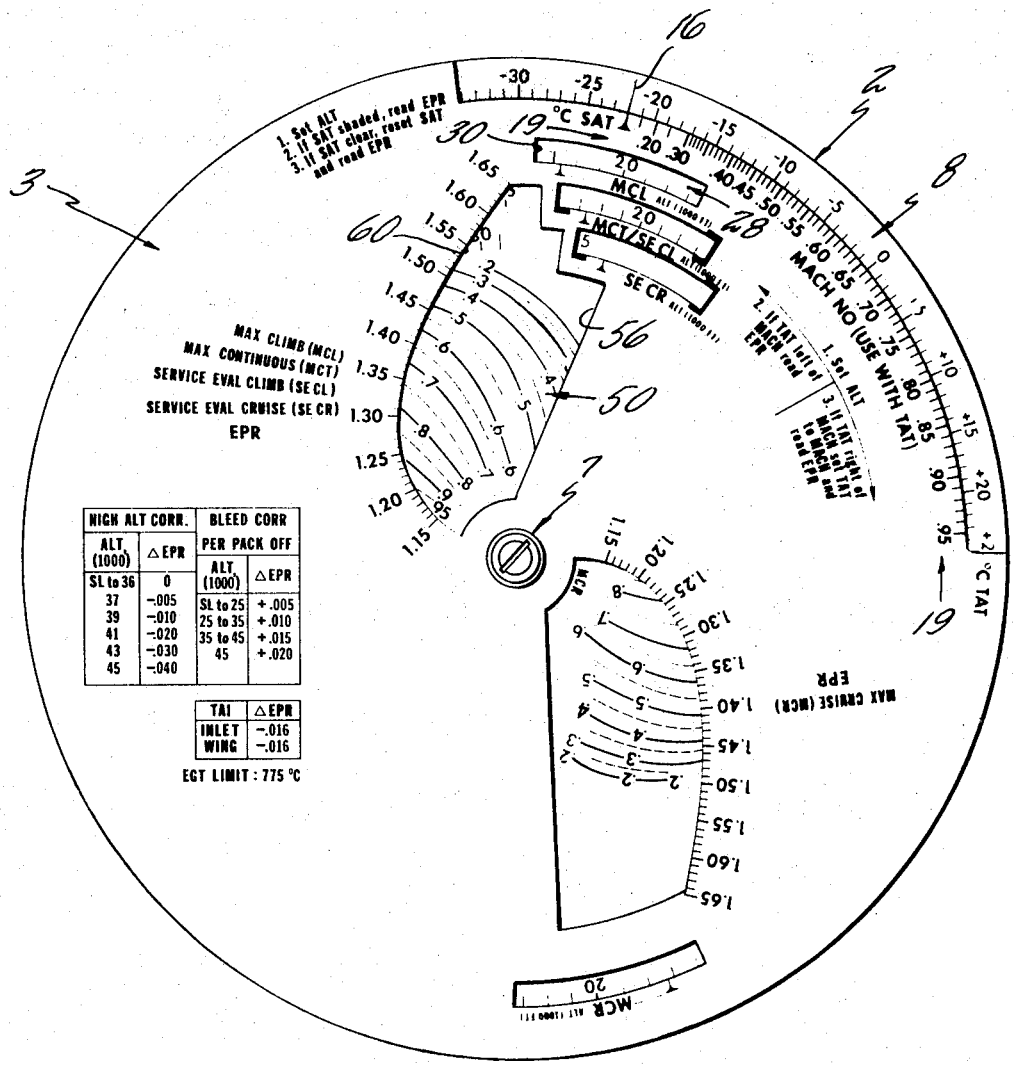
FIG. 4 is a view of the computer showing the circular base member moved with relation to FIG. 3 so that the SAT pointer is set at −22° C.

1. First the arrowhead on the inner arc of MCL window 30 is placed on the indicia 25. This has been done in FIG. 3. When this setting is made, the arrowhead opposite line 16 on window 8 indicates approximately −26.5° C. and the TAT reading opposite 0.80 MACH NO indicates approximately +5° C.
2. If the actual SAT and TAT is colder than −26.5° C. and +5° C., respectively, then the required EPR is read in the window 60 where the 0.80 curve intersects the contour 60. As seen in FIG. 3, this indicates a value of approximately 1.35.
3. However, if the actual SAT or the TAT is hotter than −26.5° C. and +5° C., respectively, then the members 2 and 3 are relatively moved so that the arrowhead on line 16 is placed on the value representing the hotter SAT reading, or the 0.80 MACH NO is placed opposite the hotter TAT reading as represented on the computer. This has been done in FIG. 4. An example is used where the actual SAT is −22° C. and the TAT is +10° C. It can be seen that the arrowhead adjacent line 16 points to −22° C. and the TAT reading opposite the 0.80 MACH NO is approximately +10° C. Now, when the reading is made in the window 56, it can be seen that the 0.80 curve intersects the contour 60 at 1.31.

To further clarify the above results it can be said of the examples that if the actual air at 25,000 feet is colder than Standard Day +8° C. the MCL EPR is 1.35 or if the actual air at 25,000 feet is hotter than Standard Day +8° C. by the amount used (−22° C. SAT at 25,000 feet) the MCL EPR is 1.31.

The numbers of arcuate scale 20 and the numbers on arcuate scale 19 were determined in the following manner. The total air temperature ($TAT$) is expressed as a function of static air temperature ($SAT$) and Mach number ($Mn$), as follows:

$TAT = SAT[1+(\gamma-1)/2 \cdot Mn)^2]$ $\gamma$ for air equals 1.4 therefore;

$TAT = SAT(1+0.2Mn^2)$

These temperatures must be in absolute terms, that is, if degrees centigrade (°C.) are used, 273° must be added to obtain the absolute temperature of degrees Kelvin (°K.). To apply the above relationship to a slide rule-type scale the formula is further expressed in logarithmic terms, as follows:

$\log (TAT \text{ in } °K.) = \log (SAT \text{ in } °K.) + \log (1+0.2Mn^2)$

Scale 20, see FIG. 1, is a logarithmic scale of °K. temperatures but the scale is labeled as °C.; that is, −26.5° C. is actually the logarithm of (273°−26.5° C.) or the logarithm of 246.5° K. Arcuate scale 19, see FIG. 2, is a logarithm scale of $(1+0.2Mn)$ and is labeled as Mach number; that is, 0.80 Mach number is actually the logarithm of $(1+0.2Mn^2)$, or logarithm $[1+0.2(0.8)^2]$ or logarithm 1.128. These scales, 19 and 20, now satisfy the equation:

$\log (TAT \text{ in } °K.) = \log (SAT \text{ in } °K.) + \log (1+0.2Mn^2)$

Using the example set forth before, the settings of which are shown in FIG. 3, the following is set forth:

$\log (TAT \text{ in } °K.) = \log (-26.5° C. + 273°) + \log [1+0.2(0.8)^2]$ $\log (TAT \text{ in } °K.) = \log (246.5° K.) + \log (1.128)$ $\log (TAT \text{ in } °K.) = 2.3918 + 0.0524 = 2.4442$ $TAT °K. = 278.1° K.$ $TAT °C. = 278.1° K. - 273° = 5.1° C.$ Looking at FIG. 3, it can be seen that opposite 0.80 Mach number on scale 19 is a reading of +5.1 ° C. $TAT$. It can be seen that the $TAT$ for a $SAT$ of −26.5° C. at 0.80 Mach number is 5.1° C.

The altitude scales 22, 28, 34, 40 of FIG. 1 are arranged so that when the corresponding rating arrowheads of windows 24, 30, 36, 42 of FIG. 2 are opposite a selected altitude, the $SAT$ arrowhead at the line 16 is opposite the appropriate rating temperature in terms of Standard Day temperature. For example, in FIG. 3, the MCL rating arrowhead on window 30 is opposite 25,000 feet. Since the Standard Day temperature for 25,000 feet is −34.5° C. and the MCL rating is based on Standard Day +8° C., therefore when the MCL rating arrowhead is opposite 25,000 feet, the $SAT$ arrowhead must point to the Standard Day temperature +8° C., which for that altitude would be −34.5° C.+ 8° C. or −26.5° C.

Figure 6:
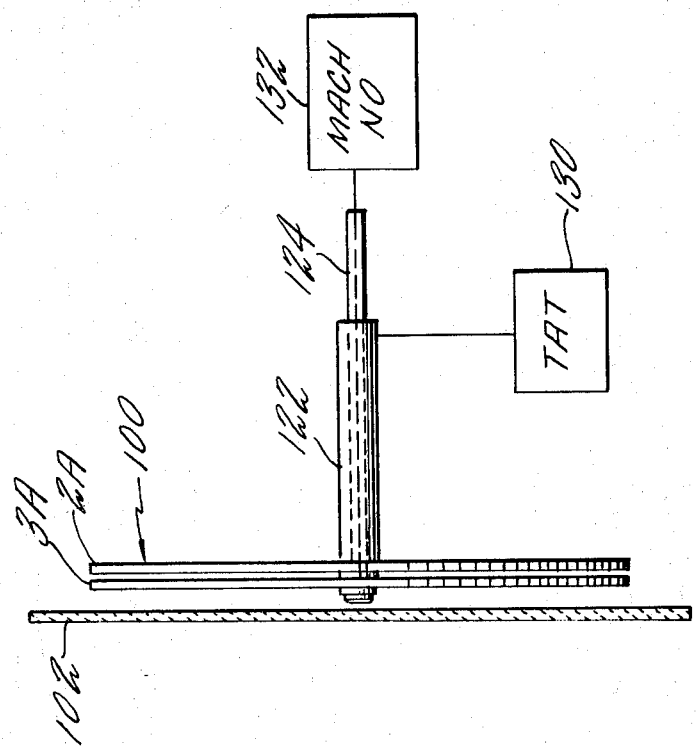
FIG. 6 is a side view of the gauge shown in FIG. 5.
Figure 5:
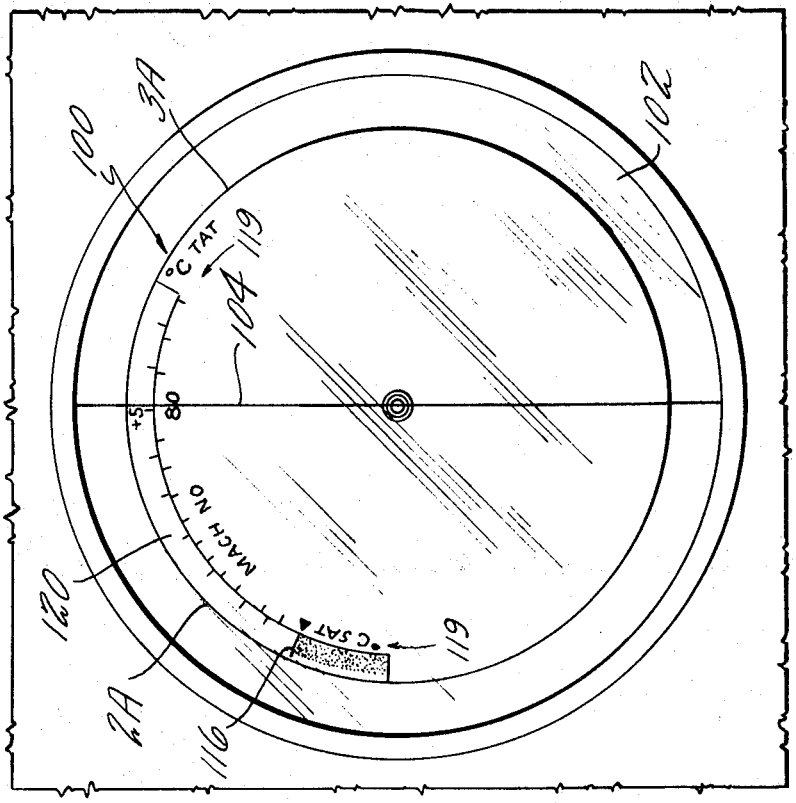
FIG. 5 is a front view showing a gauge wherein two circular scales are coaxially mounted.

With reference to FIGS. 5 and 6 the gauge 100 shown thereby comprises two relatively movable discs 2A and 3A. A glass view window 102 is fixed in relation to the members or discs, 2A and 3A has a hair line 104 placed thereon which is used to read the scales on the movable members. The scale 119 on disc 3A is identical to the scale 19 on FIG. 2 and the scale 120 on the disc 2A is the same as scale 20 in FIG. 1.

The disc 2A is pivotally mounted about its center on a hollow shaft 122 which is fixed thereto at one end. The hollow shaft 122 can be rotatably mounted by any means desired. The disc 3A is mounted for rotation on a solid shaft 124 which has one end fixed thereto. The shaft 124 extends through the hollow shaft 122 and is rotatably mounted therein. The hollow shaft 122 is rotated by a signal from a $TAT$ recorder 130 whose output is in a form compatible with the scale 120 (see scale 20 for details) so that the actual $TAT$ on scale 20 is aligned with the hair line 104. The solid shaft 124 is rotated by a signal from a Mach number recorder 132 whose output is in a form compatible to the scale 119 (see scale 19 for details) so that the actual Mach number on scale 19 is aligned with the hair line 104. Since the indicated total air temperature and the indicated Mach number can be read along the hair line 104, it can be seen that the static air temperature can be read at any given time from the arrowhead on line 116.

I claim:

1. Means for determining static air temperature from total air temperature and Mach number, comprising, a base member having first indicia thereon forming an arcuate scale thereon and an axis located on said member at the center of said arc, said first indicia being a logarithm scale of ° K. temperature with the scale labeled as ° C. an overlay member rotatably mounted on the said axis to provide relative movement between said two members, said overlay member having a first arcuate window through which a portion of the first indicia is seen, said window having an arrowhead along its inner arc, the window on the left side of said arrowhead is marked ° C. static air temperature, on the right side of said arrowhead second indicia form an arcuate scale along the inner arc of the window, said second indicia being a logarithm scale of $(1+2Mn^2)$ with the scale labeled as Mach Number.

2. A combination as set forth in claim 1 wherein said base member has third indicia thereon forming an arcuate scale, said third indicia representing altitude, said overlay member having a second arcuate window through which a portion of said third indicia is seen, an arrowhead being located on the inner arc of said second arcuate window which is used to indicate the desired altitude represented by said third indicia.

3. A computer for determining an engine pressure ratio limit for a particular engine rating comprising, a base member having first indicia forming an arc thereon and an axis located on said member at the center of said arc, said first indicia representing a first variable environmental condition affecting engine performance, said base member also having second indicia forming a second arc thereon, said second indicia representing a second variable environmental condition affecting engine performance, a family of curves being located on said base member with each curve representing a different value of an engine flight condition, an overlay member rotatably mounted on said axis to provide relative movement between said two members, said overlay member having a first arcuate window through which a portion of the first indicia is seen, said overlay member having a second arcuate window through which the second indicia is seen, said overlay member having a third window through which said family of curves is seen, said third window having a side of predetermined contour so that it intersects the family of curves in a desired manner, third indicia being located along the side of said third window of predetermined contour, said third indicia representing an engine operating parameter.

4. A combination as set forth in claim 3 wherein said first variable environmental condition affecting engine performance is temperature.

5. A combination as set forth in claim 3 wherein said second variable environmental condition affecting engine performance is altitude.

6. A combination as set forth in claim 3 wherein said engine flight condition represents Mach Number.

7. A combination as set forth in claim 3 wherein said engine operating parameter is engine pressure ratio.

8. A combination as set forth in claim 3 wherein said first variable environmental condition affecting engine performance is temperature, said second variable environmental condition affecting engine performance is altitude, said engine flight condition is Mach Number, and said engine operating parameter is engine pressure ratio.

9. A combination as set forth in claim 1 wherein a portion of said first arcuate window is shaded so that the window has a plurality of distinct viewing areas.

10. A computer for determining an engine pressure ratio limit for a particular engine rating comprising, a base member having first indicia forming an arc thereon and an axis located on said member at the center of said arc, said first indicia representing a first variable environmental condition affecting engine performance, said first indicia being a logarithm scale of ° K. temperature with the scale labeled as ° C., said baseplate also having second indicia forming a second arc thereon, said second indicia representing a second variable environmental condition affecting engine performance, said second indicia being altitude, a family of curves being located on said base member with each curve representing a different value of an engine flight condition, said engine flight condition being Mach Number, an overlay member rotatably mounted on said axis to provide relative movement between said two members, said overlay member having a first arcuate window through which a portion of the first indicia is seen, said first arcuate window having a portion shaded so that the window has a plurality of distinct viewing areas, said first arcuate window having an arrowhead along its inner arc pointing at a line between the regular window and the shaded portion, the window on the left side of said arrowhead is marked °C. static air temperature, on the right side of said arrowhead third indicia form an arcuate scale along the inner arc of the window, said third indicia being a logarithm scale of $(1+2Mn^2)$ with the scale labeled as Mach Number, said overlay member having a second arcuate window through which the second indicia is seen, said second arcuate window having an arrowhead along its inner arc, said overlay member having a third window through which a portion of said family of curves is seen, said third window having a side of predetermined contour so that it intersects the family of curves in a desired manner, fourth indicia being located along the side of said third window of predetermined contour, said fourth indicia representing an engine operating parameter, said engine operating parameter being engine pressure ratio.

* * * * *